United States Patent
Martinez

(10) Patent No.: US 8,804,221 B2
(45) Date of Patent: Aug. 12, 2014

(54) STACKING A VISIBLE IMAGE AND A SYNTHETIC HOLOGRAM

(75) Inventor: Christophe Martinez, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/498,053

(22) PCT Filed: Oct. 4, 2010

(86) PCT No.: PCT/FR2010/052088
§ 371 (c)(1),
(2), (4) Date: May 2, 2012

(87) PCT Pub. No.: WO2011/042649
PCT Pub. Date: Apr. 14, 2011

(65) Prior Publication Data
US 2012/0262768 A1   Oct. 18, 2012

(30) Foreign Application Priority Data

Oct. 5, 2009   (FR) ..................... 09 56913

(51) Int. Cl.
*G03H 1/08* (2006.01)
*G02B 5/32* (2006.01)
*G03H 1/26* (2006.01)

(52) U.S. Cl.
CPC ......... *G03H 1/08* (2013.01); *G03H 2001/0858* (2013.01); *G03H 2001/0825* (2013.01); *G03H 1/0841* (2013.01)

USPC ..................... 359/9; 359/21; 359/24

(58) Field of Classification Search
USPC ........................................ 359/24
See application file for complete search history.

(56) References Cited

U.S. PATENT DOCUMENTS

| 7,538,920 | B2 | 5/2009 | Noguchi |
| RE41,455 | E * | 7/2010 | Komma et al. ............... 359/569 |
| 2007/0047041 | A1 * | 3/2007 | Noguchi ......................... 359/24 |

FOREIGN PATENT DOCUMENTS

| EP | 0449164 A2 | 10/1991 |
| JP | H0798431 | 4/1995 |
| JP | 2000214750 A | 8/2000 |
| JP | 2007065139 | 3/2007 |

OTHER PUBLICATIONS

Written Opinion of the International Searching Authority in PCT/FR10/052088.
International Search Report issued in PCT/FR2010/052088 on Jan. 31, 2011.
EPO machine translation of specification of JPH0798431.

* cited by examiner

*Primary Examiner* — Jade R Chwasz
(74) *Attorney, Agent, or Firm* — Vedder Price PC

(57) ABSTRACT

A synthetic hologram of a first image consists of an array of coding cells each comprising light and dark portions. A second visible image is superposed to the synthetic hologram, where the light and dark portions of selected coding cells in the second visible image are inverted and have a phase modified by an offset value relative to other coding cells of the rest of the hologram.

9 Claims, 9 Drawing Sheets

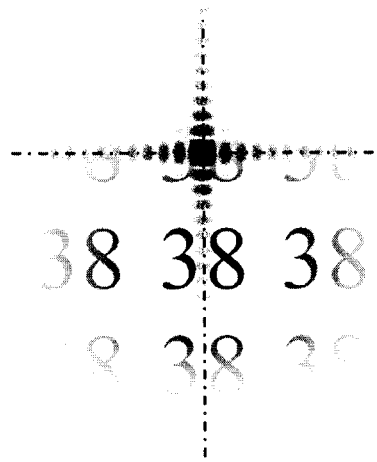 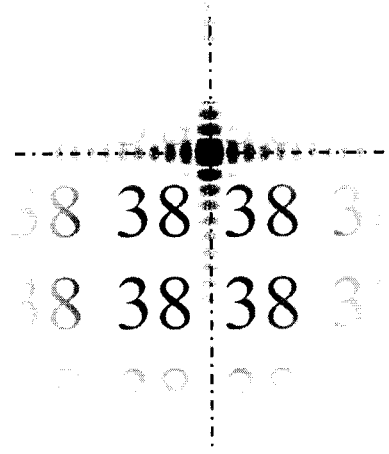
FIG 9A　　　　　　　　　　　FIG 9B
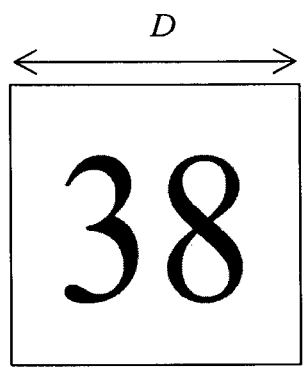 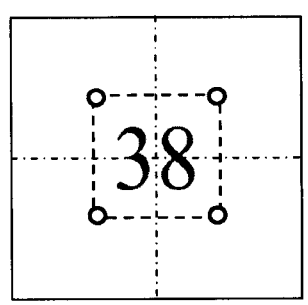 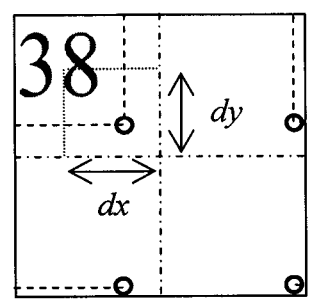
FIG 10A　　　　　FIG 10B　　　　　FIG 10C

STACKING A VISIBLE IMAGE AND A SYNTHETIC HOLOGRAM

FIELD OF THE INVENTION

The present invention relates to the superposing of a visible image and of a synthetic hologram.

DISCUSSION OF PRIOR ART

Fighting imitations is a major concern of industry. To guarantee the origin of their products, manufacturers must use secure identification and traceability elements. Such elements must be sufficiently complex to design and to obtain, in order to deter or even prevent their copying. Various solutions have thus been developed for this purpose.

It has been provided to use data matrixes, which are two-dimensional bar codes. Such matrixes are formed of white and black squares which enable to code data in a binary format. The information contained in the data matrix may be protected by a read code which prevents its deciphering by those who do not have the key.

It has also been provided to use synthetic holograms formed on small supports. Such holograms are difficult to copy since they result from sophisticated manufacturing technologies and require dedicated equipment for their reading.

U.S. Pat. No. 7,193,754 provides superposing a directly-visible image to a synthetic hologram in order to make copies even more difficult. The white unwritten areas of the hologram enable to reveal, by contrast with the written areas of the hologram, an image, for example, a portrait or a data matrix. A disadvantage of the provided method is that the hologram portion placed under the visible image is suppressed. This omission of part of the hologram however enables to read the content of the hologram, but with a decreased resolution, the resolution being proportional to the hologram surface area for a hologram of given definition.

FIELD OF THE INVENTION

The present invention aims at forming a synthetic hologram to which a visible image is superposed without losing information contained in the hologram and without decreasing the hologram definition.

Thus, an embodiment of the present invention provides a synthetic hologram formed of a network of coding cells, comprising a pattern in which the cells are inverted and have a phase modified by an offset value with respect to the rest of the hologram.

According to an embodiment of the present invention, the offset is constant and equal to $\pi$, whereby the optical reconstruction of the hologram is not disturbed and the pattern can be directly observed.

According to an embodiment of the present invention, the offset is constant and different from $\pi$, the optical reconstruction of the hologram being performed with a phase key introducing, according to the shape of said pattern, a phase-shift complementary to $\pi$ of said offset.

According to an embodiment of the present invention, the offset is not constant and is different from $\pi$ in different areas of said pattern, the optical reconstruction of the hologram being performed with a phase key introducing, according to the shape of said areas of said pattern, a phase-shift complementary to $\pi$ of said offset.

According to an embodiment of the present invention, the pattern in a grey-level image obtained by screening based on a screening cell, the size of the screening cell being an integral multiple of the size of a cell of the hologram.

According to an embodiment of the present invention, the pattern is a random or semi-random matrix of black and white pixels, the size of a pixel of the pattern being an integral multiple greater than or equal to 1 of the size of a cell of the hologram.

According to an embodiment of the present invention, the image coded by the hologram has a decreased useful area, offset from the center of the general image by a distance at least equal to half the length of the useful area.

According to an embodiment of the present invention, the image is offset by the introduction of a linear phase component in the phase distribution of the hologram.

The present invention also provides a method for manufacturing a synthetic hologram superposed to a directly visible pattern, comprising the steps of:
computer manufacturing of an image Ih for the hologram,
computer manufacturing of an image Im of the pattern,
calculation of the Fourier transform (FT) of image Ih,
coding of the amplitude of the FT by generation of a matrix A of aperture sizes,
coding of the phase of the FT by generation of a matrix P of aperture offsets,
generation of a first amplitude matrix A1 corresponding to the intersection between A and Im,
generation of a first phase matrix P1 corresponding to the intersection between P and Im,
generation of a second amplitude matrix A2 corresponding to the intersection between the inverted or negative representation of A and the complementary of Im,
generation of a second phase matrix P2 corresponding to the intersection between matrix P, to which is added a phase shift f0, and the complementary of Im,
gathering of matrixes A1 and A2 in a single matrix A',
gathering of matrixes P1 and P2 in a single matrix P',
lithography of a substrate with the generation of a matrix of apertures having sizes and positions defined by the two previous matrixes.

BRIEF DESCRIPTION OF THE DRAWINGS

The foregoing and other objects, features, and advantages of the present invention will be discussed in detail in the following non-limiting description of specific embodiments in connection with the accompanying drawings, among which:

FIGS. 9A and 9B illustrate two examples of hologram reconstruction;

FIGS. 10A, 10B, 10C illustrate an offset method;

REMINDER ON SYNTHETIC HOLOGRAMS

The present invention is based on an analysis and on a specific use of the properties of a synthetic hologram, which will be reminded hereafter.

Figure 1:
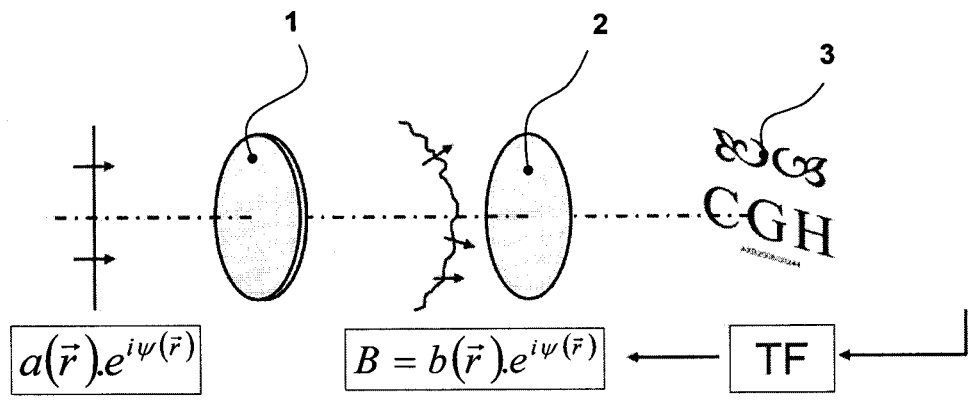
FIG. 1 shows a hologram placed on the path of a light beam.

FIG. 1 shows a hologram 1 placed on the path of a beam E. The beam is diffracted by the hologram and generates a beam B. This beam is recovered by a lens or another optical system 2 which allows the Fourier conjugation. In the focal plane of the lens, an image 3 which corresponds to the Fourier transform of beam B generated at the hologram output is obtained.

Synthetic holography is the science which enables to generate beam B in order to obtain computer-generated image 3.

If r designates a unity vector with radial coordinates, and $$E = a(r) \cdot e^{i\phi(r)}, \text{ and}$$

$$B = b(r) \cdot e^{i\psi(r)},$$

the mathematic resolution of the problem assumes calculating transfer function H provided by the following equation:

$$H(r) = [b(r)/a(r)] \cdot e^{i(\psi(r) - \phi(r))} \quad (1)$$

In the rest of the discussion, wave A is assumed to be planar and uniform so that $E \cong 1$. In practice, equation (1) is impossible to fully satisfy. It must indeed be possible to manufacture a transmission element capable of coding both the phase and the amplitude of the incident wave. To do away with this constraint, many strategies have been developed.

The synthetic hologram generation method set forth by Brown and Lohmann in 1966 "Complex Spatial Filtering with Binary Masks", *Appl. Opt.* 5, 967-969, which comprises segmenting transfer function H into cells, will be considered herein. Each cell comprises two regions having different transmission or reflection characteristics. For example, each cell comprises an opaque portion and a transparent portion (or a reflective portion and a transparent or opaque portion). The relative dimension of the two portions corresponds to the amplitude, and the offset of the central portion with respect to the center of the cell corresponds to the phase.

Figure 2:
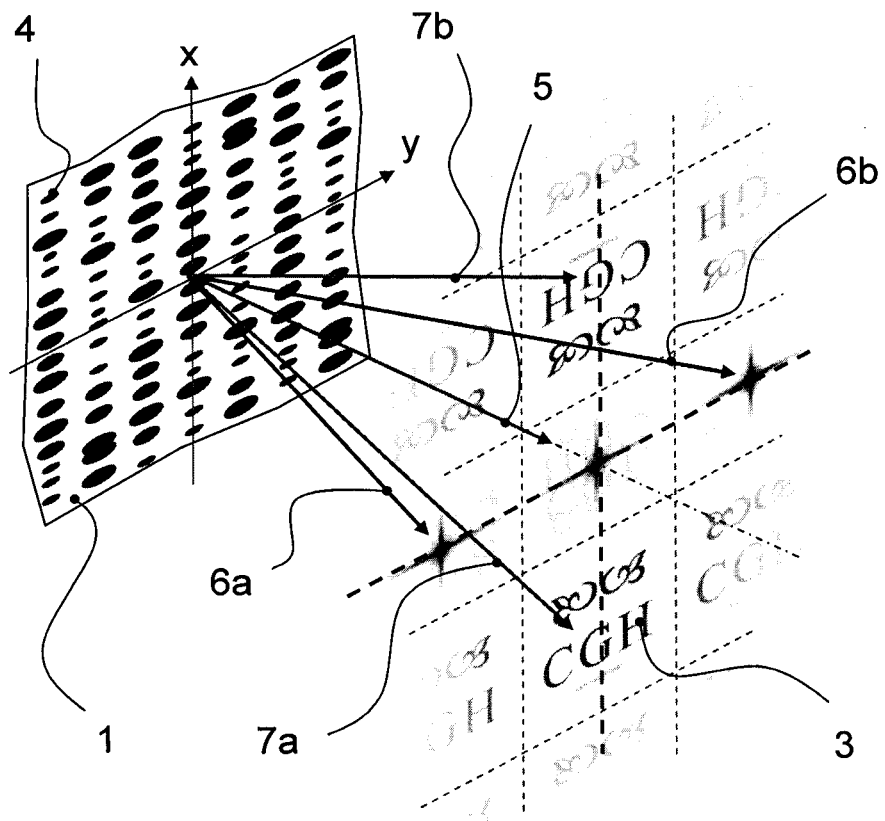
FIG. 2 shows an example of a synthetic hologram and illustrates its reading.

FIG. 2 shows an example of a synthetic hologram 1 and illustrates the reading principle. The hologram is formed of a cell matrix of step p and comprises apertures 4 through which light will be diffracted. The apertures are all aligned along direction x. The phase of the wave to be generated is coded along this direction, an offset by half the height of a cell (p/2) corresponding to a π phase shift.

Two beams 6a and 6b are thus generated to the right and to the left, along direction y, corresponding to orders +1 and −1 of the diffraction grating. They provide, after the passing through the Fourier lens, two light spots symmetrical with respect to central spot 5 of order 0 of the beam.

Along the vertical direction (direction x), one can find two diffracted beams 7a and 7b, at the top and at the bottom, corresponding to orders +1 and −1 of the hologram. After the Fourier lens, these beams will reproduce the desired image 3 and its conjugate. Additional images generated by the hologram sampling distribute around these images.

The reading is thus performed by illuminating the hologram with a coherent laser-type beam, by recovering the wave diffracted by a Fourier lens, and by detecting the desired image area with a camera.

The hologram manufacturing follows the steps of:
1. computer manufacturing of an image,
2. calculation of the Fourier transform (FT) of the image,
3. coding of the amplitude of the FT by generation of a matrix of aperture sizes,
4. coding of the phase by generation of an aperture offset matrix,
5. lithography of a substrate with generation of a matrix of apertures having their sizes and positions defined by the two previous matrixes.

The present discussion considers the case of the coding developed by Brown and Lohmann in 1966. Other cell coding methods apply similarly. The interference pattern method may also be used.

DETAILED DESCRIPTION

The present invention is based on an analysis of hologram reading properties.

FIG. 1, previously described, illustrates the reading of a hologram with Fourier optics. A planar wave E illuminates a hologram H. Fourier lens 2 generates the Fourier transform of the wave generated by the hologram. An image 3, noted $I_a$, is obtained. Function $\underline{H}$ descriptive of the physical hologram will be considered. Transmission function $\underline{H}$ is a binary function which can be accounted for in the form of a distribution of values equal to 0 or to 1. Value 0 corresponds to an opaque or non-reflective area, value 1 corresponding to a transmission or reflection area. The holography operation may be mathematically accounted for by the following equation:

$$I_a = FT(E\underline{H}) \times FT(E\underline{H})^*$$

A specific property of the hologram, general to the diffraction principle, relates to the diffraction of the hologram negative. A hologram negative is a hologram having inverted transmissive and opaque portions. The negative representation of the hologram may be mathematically noted 1-$\underline{H}$. It can be shown that such a negative in which a π phase shift is imposed to each of the cells provides in read mode an image $I_b$ identical to image $I_a$ of the corresponding positive hologram.

Generally, the aspect of a hologram in positive mode is a light image (comprising much more white than black areas) while that of a hologram in negative mode is a dark image (comprising many more black areas than white). It is here provided to mix, in a same hologram, cells in positive mode and in negative mode. This enables to generate a directly visible image corresponding to the pattern of the cells in negative mode.

Figure 3A:
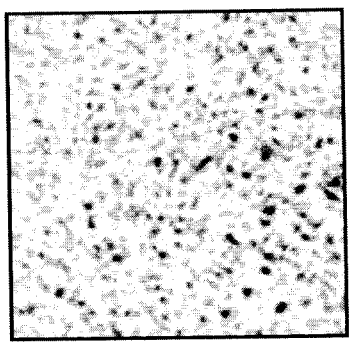
FIGS. 3A to 3F illustrate a method of superposing of a hologram and of a visible image according to an embodiment of the present invention.
Figure 3B:
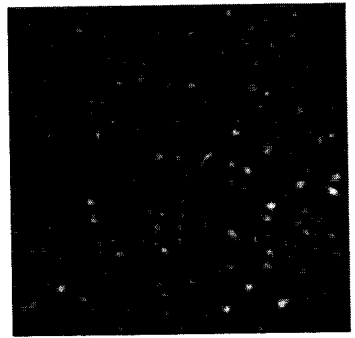
Figure 3C:
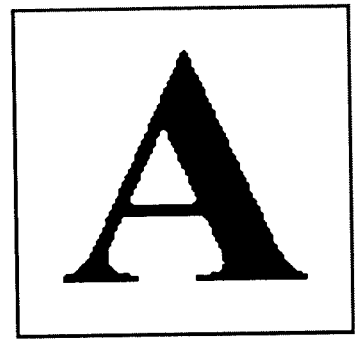

FIGS. 3A to 3F illustrate the general principle used herein. FIG. 3A (image 1) shows, as an example, the shape of a hologram of an image, not shown. FIG. 3B (image 2) shows the negative version, phase-shifted by π, of this hologram. FIG. 3C (image 3) shows a pattern, here letter A, which is desired to be visible, superposed to the hologram.

Figure 3D:
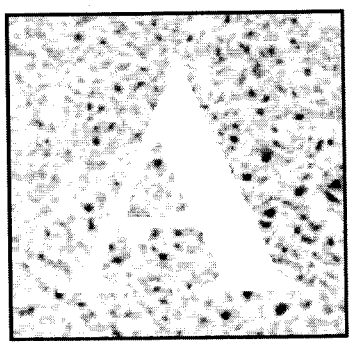
Figure 3E:
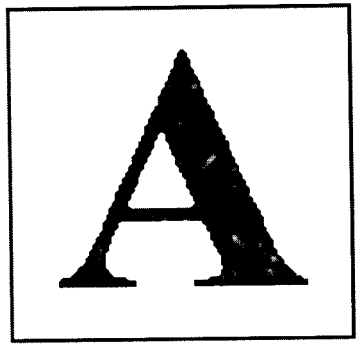

Image 3 is subtracted from image 1 as shown in FIG. 3D (image 4). Image 3 is extracted from image 2 as shown in FIG.

Figure 3F:
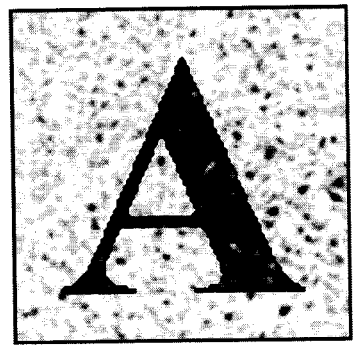

3E (image 5). As shown in FIG. 3F (image 6), images 4 and 5 are gathered to provide image 6.

As can be seen, a new hologram H' in which letter A appears in image 6 without having lost any data of the original hologram is obtained.

On reconstruction, the image generated by phase-shifted inverted hologram H' is mathematically identical to that generated by hologram H.

Figure 4A:
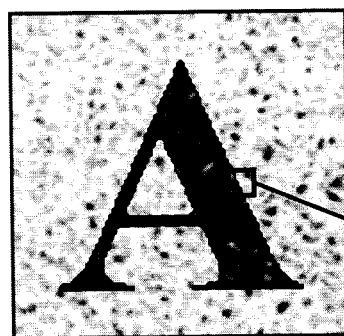
FIG. 4A shows a hologram coded according to an embodiment of the present invention and FIG. 4B is a detail view of a group of 5×5 cells, some positive and some negative.
Figure 4B:
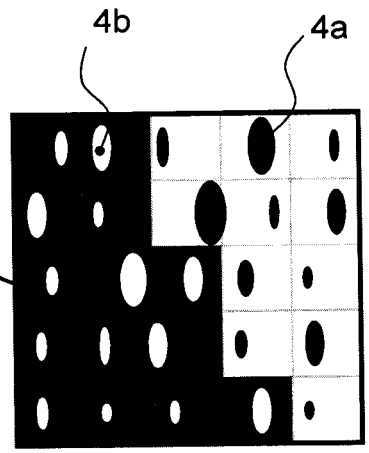

FIG. 4A shows a hologram according to an embodiment of the present invention in the retained coding case. FIG. 4B is a view of a detail of a group of 5×5 cells, some positive and other negative at a limit of the directly visible pattern. The apertures being generally small as compared with the total cell dimension, a very good contrast of the superposed image is obtained at a macroscopic vision level.

The manufacturing of a synthetic hologram according to an embodiment of the present invention thus follows the steps of:
1. computer manufacturing of an image Ih for the hologram;
2. computer manufacturing of an image Im for direct vision;
3. calculation of the Fourier transform (FT) of image Ih,
4. coding of the amplitude of the FT by generation of a matrix A of aperture sizes,
5. coding of the phase of the FT by generation of an aperture offset matrix P,
6. generation of a first amplitude matrix A1 corresponding to the intersection between A and Im,
7. generation of a first phase matrix P1 corresponding to the intersection between P and Im,
8. generation of a second amplitude matrix A2 corresponding to the intersection between the inverted or negative representation of A and the complementary of Im,
9. generation of a second phase matrix P2 corresponding to the intersection between matrix P to which is added a phase shift f0 and the complementary of Im,
10. gathering of matrixes A1 and A2 in a single matrix A',
11. gathering of matrixes P1 and P2 in a single matrix P',
12. lithography of a substrate with generation of a matrix of apertures having sizes and positions defined by the two previous matrixes.

It has been explained that for the combined (positive-negative) hologram to provide the same image as the original hologram, the negative hologram had to be phase-shifted by $\pi$. To achieve this, it has been provided to phase-shift by $\pi$ each cell of the hologram. Other embodiments may be implemented.

Figure 5:
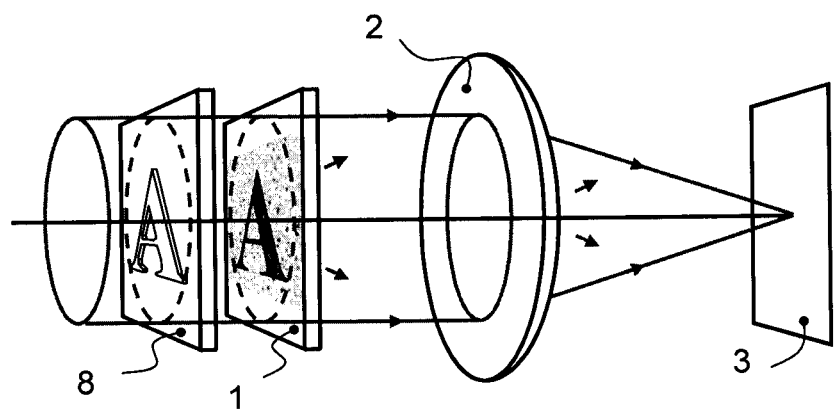
FIG. 5 illustrates a read mode in the case where the phase shift f0 of each inverted cell is different from $\pi$.

As an example, FIG. 5 shows a reading case for which phase shift f0 of each inverted cell is different from $\pi$. In this case, a retardation plate 8 which generates a phase shift f1 on the incident beam at the level of the superposed image is used so that the cumulated phase shift complies with the following relation:

$$f1+f0=\pm\pi\,\text{modulo}\,2\pi \quad (2)$$

The distributions of phase shifts f1 and f0 may also be non-constant, provided for relation (2) to remain true at all function definition points.

The use of a phase shift different from $\pi$ may be advantageous in that the reading of the hologram requires using a phase key.

Assembly for the Reading of Holograms

Figure 6:
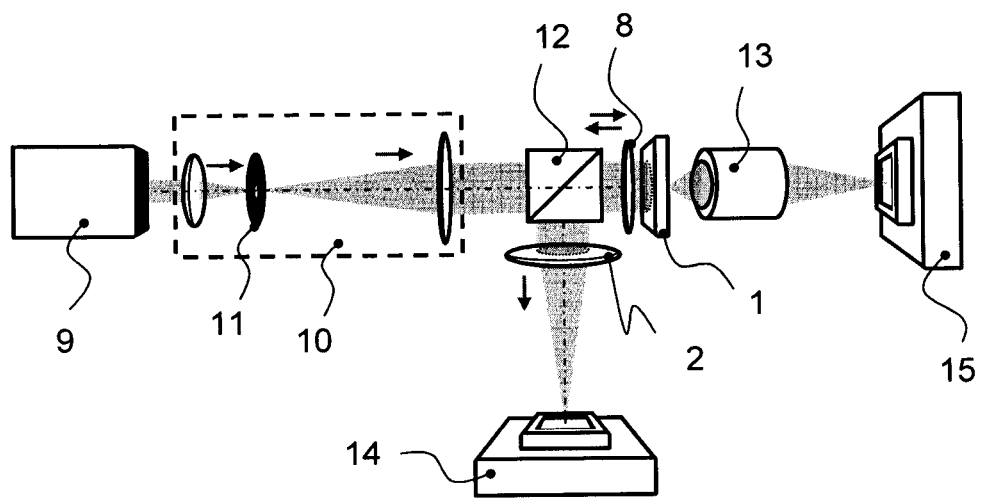
FIG. 6 shows an assembly for the reading of a hologram according to an embodiment of the present invention.

FIG. 6 shows an assembly for the reading of a hologram according to the present invention. For this purpose, a Fourier optics reading assembly with an additional imaging portion of the superposed image is used. The drawing illustrates a hologram reflection reading version.

A laser 9 shaped by a telescopic-type system 10 capable of containing a spatial filter 11 is used. The beam having a diameter of the order of magnitude of the hologram size arrives on a semi-reflective cube 12. The transmitted beam optionally crosses a retardation plate 8, and then illuminates hologram 1.

The beam diffracted by reflection crosses back the retardation plate, which has a phase shift adapted to this back and forth travel (in practice, the phase shift induced by the plate is half the necessary phase shift). Then, it crosses the cube and part of the diffracted beam is sent back onto Fourier optics 2, after which its image is formed on an array sensor 14.

Part of the incident beam crosses the hologram. Optics 13 then ensures an imaging relation between the hologram plane and the plane of array sensor 15 to form the image superposed to the hologram on said plane. To avoid disturbances inherent to coherent mode imaging, a second incoherent light source may be used to display the image superposed to the hologram on sensor 15.

Hologram Manufacturing

The manufacturing of holograms according to the invention raises no specific technical issues. The hologram cells are divided into sub-portions corresponding to the write resolution of the used lithography tool (electronic beam, laser writing . . . ).

Figure 7:
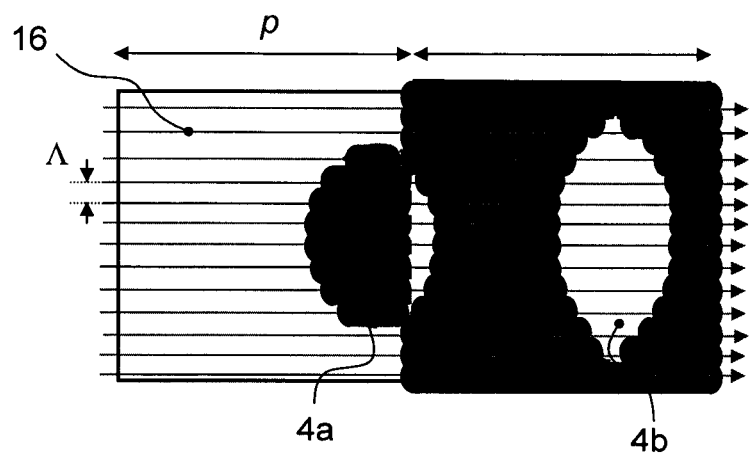
FIG. 7 illustrates an example of manufacturing of two cells, one positive, the other one negative with a writing equipment of scanning laser type.

FIG. 7 provides an example of manufacturing of two cells, one positive, the other one negative with scanning laser write equipment. Both cells have apertures, 4a and 4b. The laser is on or off during its scanning 16 to form the structure of the apertures in positive or negative cells. The drawing shows the specific case of an aperture which is offset so that it encroaches upon the neighboring cell. In this case, a same aperture may be processed both in negative and positive mode as indicated in the diagram.

Scanning step A is selected to provide the best compromise between the write time and the right aperture definition.

Hologram Design

Figure 8:
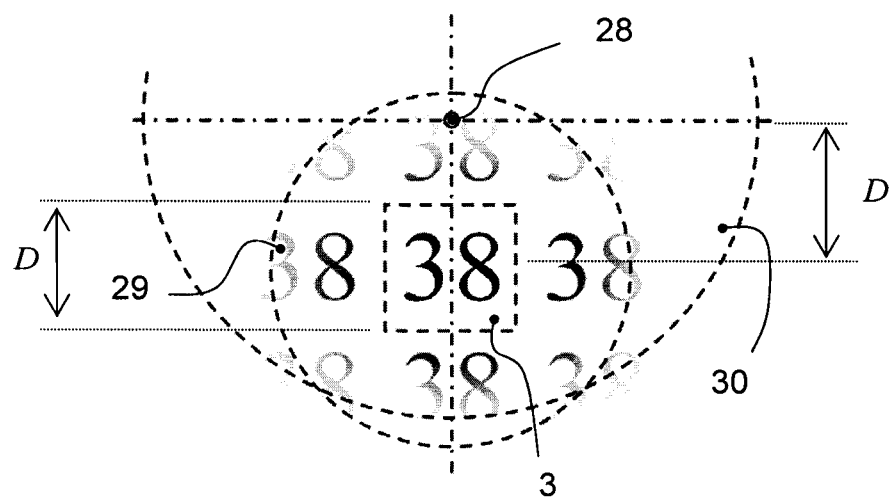
FIG. 8 illustrates observed hologram images (here, number "38")

FIG. 1 has enabled to show the operation of the synthetic hologram diffraction process. FIG. 8 details the repercussion on the reconstruction of a desired image 3 (here, number 38).

The reconstructed image is below optical axis 28 at a distance D set by three parameters: reading wavelength $\lambda$, cell definition step p, and focal distance f of the lens used for the reading. Distance D is provided by:

$$D=\lambda \cdot f/p$$

Distance D also corresponds to the image size.

Replicas caused by the sampled character of the hologram are distributed around the central image. The visibility of such replicas decreases as the distance to the central image increases. Such a radial weighting 29 depends on the diffraction efficiency of the apertures.

Another weighting 30 due to the numerical aperture of the read optics adds to this weighting. The conjugate order has not been shown in FIG. 8 to simplify the explanation.

It is important to understand the reconstruction to optimally choose the hologram.

Most of the illumination beam undisturbed by the hologram is concentrated at the level of optical axis 28. This is the lens focusing point.

Additional information has been added to the hologram in the form of the superposed pattern defined by image Im. The reading of the hologram will generate two Fourier transforms. The first one corresponds to H and is distributed in orders +1 and −1 of the hologram. The second one corresponds to the Fourier transform of image Im. Since the Fourier transform generates no angular carrier, due to its design, its Fourier transform is centered on optical axis 28.

FIGS. 9A and 9B illustrate two examples of reconstruction respectively showing the FT of H forming number 38 surrounded by its replicas and the FT of an image centered on the optical axis. In the case of these drawings, the superposed image is a data matrix and its FT distributes in a cross.

FIG. 9A shows a superposing in the reconstruction plane between the desired image and the FT of the superposed image. The reconstruction is thus disturbed. To solve this problem, a solution is to offset the desired information outside of the disturbed area. This is shown by FIG. 9B. The suppression of the superposing of the two FTs is performed to the detriment of the image visibility since it is moved away from the reconstruction center. A compromise will thus be adopted.

FIGS. 10A, 10B, 10C illustrate the offset principle. Two solutions are available to generate offsets dx and dy:
offsetting the image on design thereof,
introducing a linear phase shift on the hologram phase as it is being calculated.

The two cases are equivalent but the second solution should be preferred on account of its simplicity. It takes advantage of a specific property of the FT described in the following equation:

$$FT[h(x)e^{-2i\pi v_0 x}] = \check{h}(v-v_0)$$

To optimize the reconstruction, the useful area of the image may also be concentrated in the image to be reconstructed, as shown in FIGS. 10A-C:
FIG. 10A shows the desired image
FIG. 10B shows the image to be coded by the hologram, the desired image amounts to a small portion of the general image,
FIG. 10C shows the image to be coded by the hologram in which the useful area has been offset in both directions x and y to ease the reconstruction.

Nature of the Superposed Images

FIG. 3 has given a general view of the method described herein. It shows a character superposed to a synthetic hologram. In this case, an image in black and white is thus superposed to the hologram.

Figure 11:
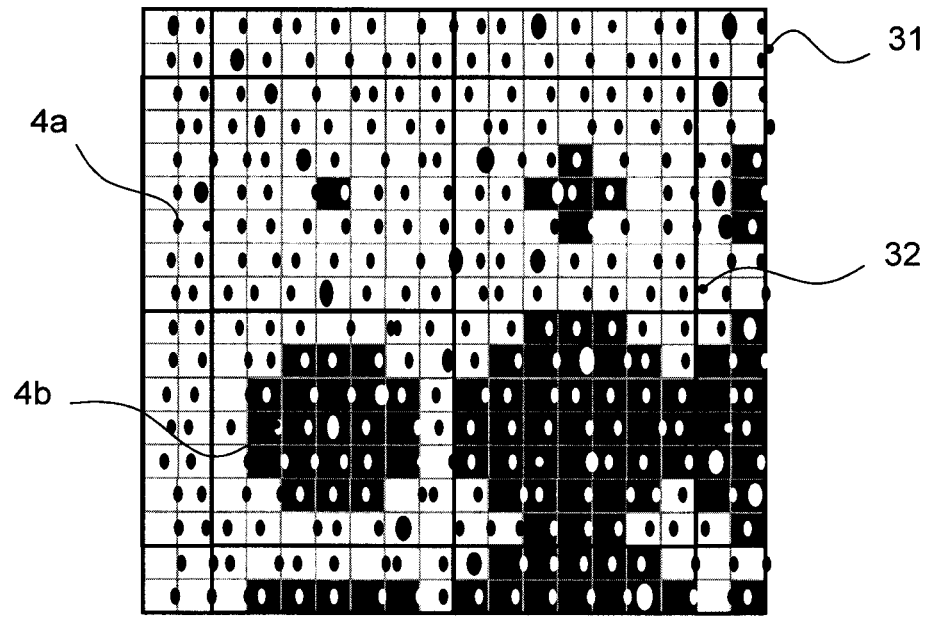
FIG. 11 illustrates a method capable of forming a superposed grey-level pattern.

The nature of the superposed images may however be different. In particular, images in grey levels may be considered. To achieve this, two levels of cells may be defined, as shown in FIG. 11. Cell 31 is the hologram definition cell. Aperture 4 which codes the hologram information is inserted therein.

Cell 32 is the superposed image screening definition cell. The size of cell 32 is provided by a multiple N greater than or equal to 1 of the size of cell 32. In the illustrated case, the multiple is equal to 7.

The grey level image is defined by a screening on a cell of N×N pixels. In the case of the drawing, N=7 and the image may be coded over at least 11 grey levels.

The apparent grey level is provided by the size of the different groups of dark cells 31. If dark cells 31 cover the entire cell 32, this image area will appear to be black. Conversely, if no dark cell 31 is present in cell 32, this image area will be perceived as white by the viewer. In between, the filling of dark cells in cell 32 gives the viewer the illusion of the grey level when the image is seen from a certain distance. This is called screening and is widely used in printing.

Figure 12:
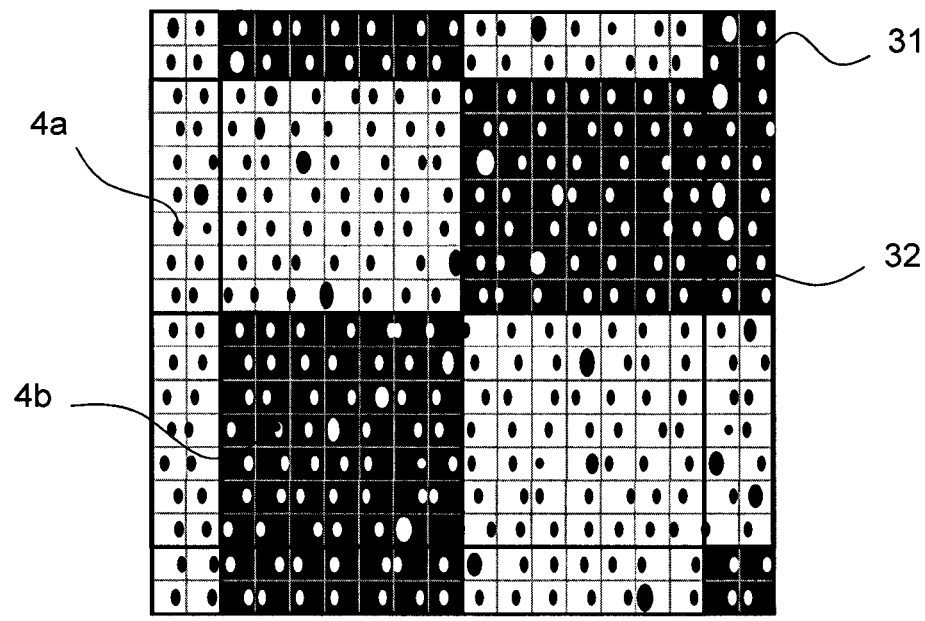
FIG. 12 illustrates an example in which the superposed pattern is a data matrix-type image.

A privileged case of application of the present invention relates to the superposing of a data matrix image. In this case, the pixel of the data matrix is similar to cell 32, as shown in FIG. 12.

The advantage of the data matrix is that the superposed image is highly structured. Reconstructing the underlying hologram is very difficult, unless using the technique provided herein.

In this case also, the use of a phase key is particularly relevant.

The apparent grey level is provided by the size of the different groups of dark cells 31. If dark cells 31 cover the entire cell 32, this image area will appear to be black. Conversely, if no dark cell 31 is present in cell 32, this image area will be perceived as white by the observer. In between, the filling of cell 32 with dark cells gives the user the illusion of the grey level when the image is watched from a certain distance. This is called screening and is widely used in printing.

Simulations

To illustrate the advantages of the method and of the device described herein, the case of a double data matrix coding is discussed hereinafter. FIGS. 13A-B and 14A-B show the images and holograms used.

Figure 13A:
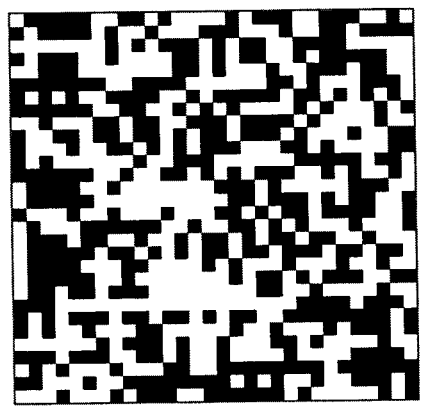
FIGS. 13A-B and 14A-B show examples of holograms and of superposed patterns in the case where both correspond to data matrixes.

In FIG. 13A, a random matrix of black and white pixels has been simulated. The size of the data matrix is 30×30 pixels. The final image has a 600×600-pixel dimension, that is, a value N=20.

Figure 13B:
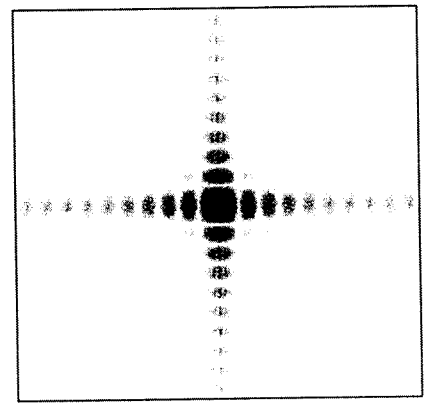

FIG. 13B shows the amplitude of the FT of the image of FIG. 13A. As mentioned, a cross-shaped diffraction pattern is obtained.

Figure 14A:
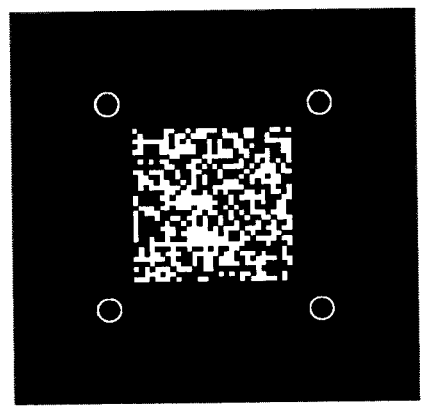
Figure 14B:
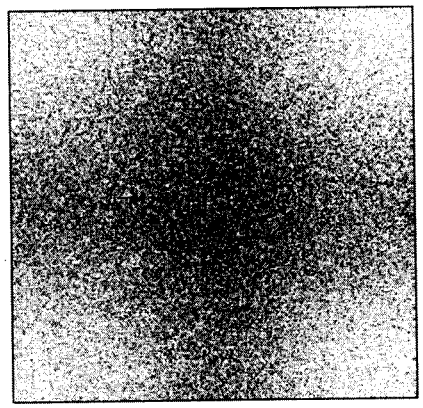

The same data matrix is used to generate the coded image of the hologram. To achieve this, the data matrix is sampled to cover an area of 240×240 pixels in an image also having a 600×600-pixel dimension. FIG. 14A shows the image used for the coding. FIG. 14B shows the amplitude of the FT. In the case of the example, a scrambling of the image phase has been used to decrease the Fourier peak. This is a conventional technique of synthetic holography—see C. B. Burckhardt, 1970, "Use of a Random Phase Mask for the Recording of Fourier Transform Holograms of Data Masks", Appl. Opt. 3: 695-700. To make the vision of FTs easier, the image contrast has been increased in FIGS. 13B and 14B.

The hologram reconstruction has then been simulated in the case of a 650-nm reading with a 4-m hologram step. The coding of FIG. 21B is performed over 193 amplitude values and 80 phase values.

Figure 15A:
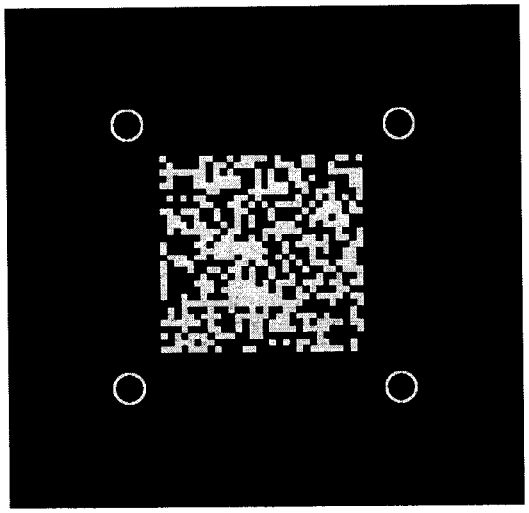
FIGS. 15A-C show results observed by simulation.
Figure 15B:
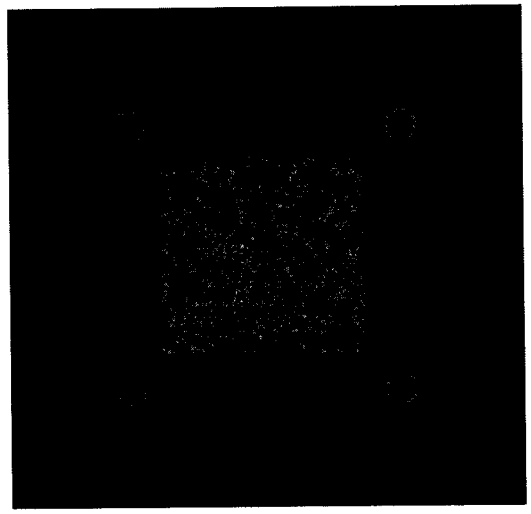
Figure 15C:
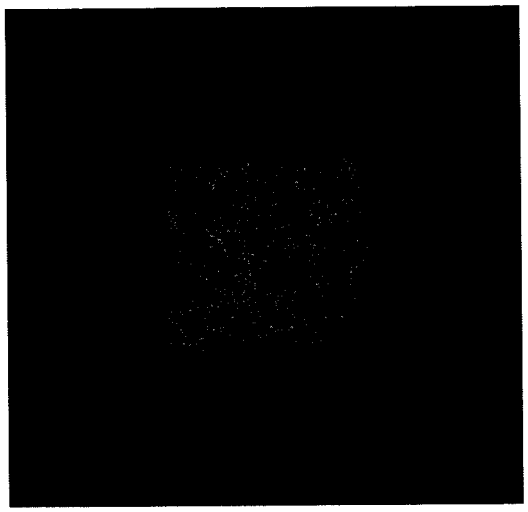

FIGS. 15A-C show the results observed by simulation.

FIG. 15A shows the case of a perfect reading, that for which the disturbance induced by the superposed image is corrected by the phase shift of the inverted pixels. This case is that of the present invention. The drawing shows that the result is very close to the original in FIG. 14A with only slight intensity variations in white pixels.

FIG. 15B shows the case where the pixels of the superposed image cancel the amplitude values of the FT. This case is that of prior art. As mentioned, the matrix detection is disturbed but remains possible with an advanced image processing.

FIG. 15C shows the case where the disturbance induced by the superposed image is not corrected by the phase shift of the inverted pixels. This would here correspond to sizing a hologram to be read with a phase key and perform the reading without the key. It can be seen that the matrix reconstruction is strictly impossible in this case. The use of a phase key as claimed herein thus is an extremely effective way to fight imitations.

It should be noted that simulations do not take into account phenomena of weighting by the radial variation of the diffraction efficiency. The image in FIG. 14A is not offset either as in FIG. 10C, for simplification.

This simulation clearly shows that the method provided herein introduces an unquestionable gain over prior art.

In the practical rereading assembly, parasitic noise inevitably occurs. The detected signal is thus altered. The solution provided by FIG. 15B may then be inefficient for the coded image recovery.

Experimental Results

Experimental results enabling to underline the advantages of the provided method will be indicated hereinafter.

Figure 16:
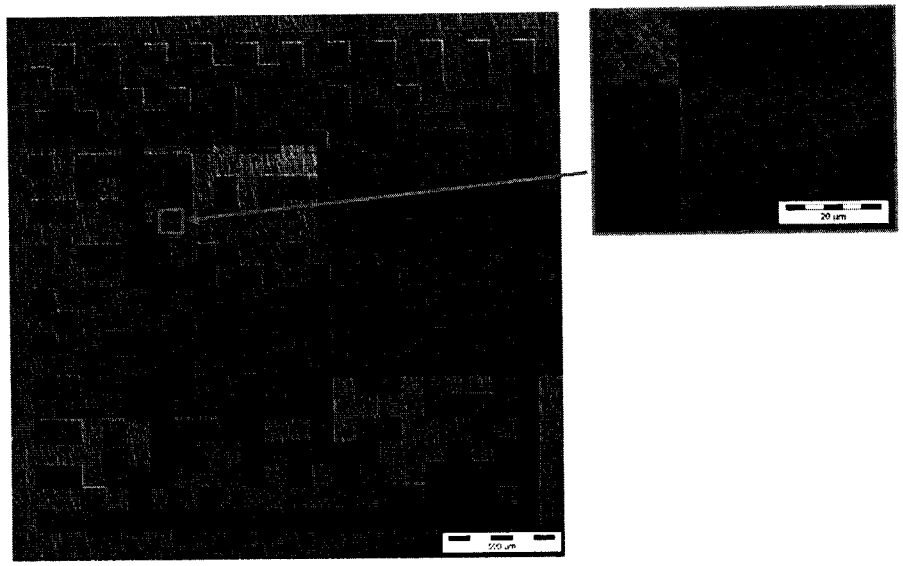
FIG. 16 shows a view of a data matrix hologram with a superposed data matrix.

FIG. 16 shows a view of a hologram with a superposed data matrix and, to the top right, an enlargement of an area of this view. The data matrix is clearly shown. The photograph has been taken with a microscope after insolation of a $PtO_x$ layer before the chemical etching. After the chemical etching, the contrast is even stronger.

For the needs of the demonstration, four holograms have been etched for comparison with FIG. 15. The holograms are read in reflection with an assembly similar to that of FIG. 6.

Figure 17A:
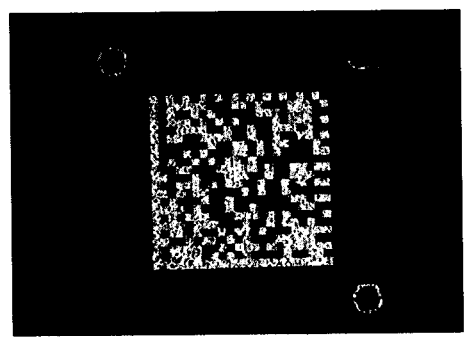
FIGS. 17A-D show various experimental results.

FIG. 17A shows the case of a standard hologram with no superposed image. The data matrix detection seems efficient despite a speckle noise.

Figure 17B:
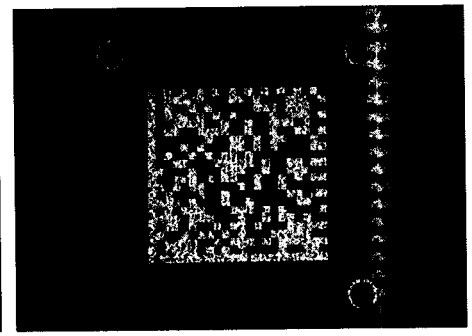

FIG. 17B shows the case of FIG. 15A. It is a data matrix hologram with a macroscopic data matrix superposed according to the present invention. It is written in positive and negative cells with a phase correction. An alteration of the signal with respect to FIG. 17A can be observed but the detection of the data matrix remains possible with a good image processing. The alteration between the results of FIGS. 17A and 17B may be due to a problem of resolution of small patterns in negative cells.

Figure 17C:
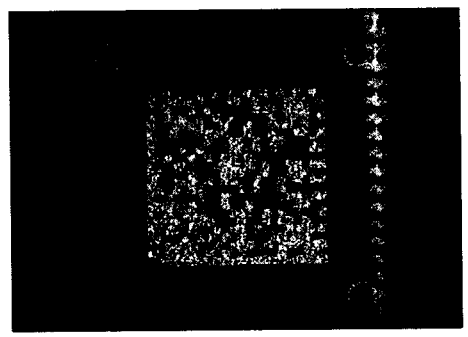

FIG. 17C shows the case of prior art. Only part of the pixels of the data matrix are written. The data matrix can still be seen but the identification of its pixels seems more difficult than in case 24b.

Figure 17D:
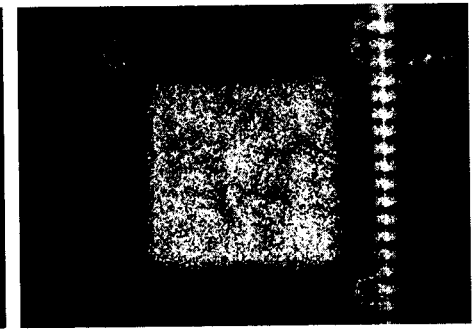

Finally, FIG. 17D shows the case of superposed images with no phase correction (case of FIG. 15C). The data matrix can no longer be identified. This case, which corresponds to the absence of a phase key, shows the advantage of the invention associated with a phase key system.

Various embodiments with different variations have been described hereabove. It should be noted that those skilled in the art may combine various elements of these various embodiments and variations without showing any inventive step.

The invention claimed is:

1. A synthetic hologram of a first image formed of an array of coding cells, each of which comprises light and dark portions, comprising a second visible image superposed to the hologram, formed on a portion of the hologram, in which the light and dark portions of selected coding cells of the hologram are inverted and have a phase modified by an offset value with respect to other coding cells of the synthetic hologram of the first image.

2. The hologram of claim 1, wherein the offset is constant and equal to $\pi$, whereby the optical reconstruction of the hologram is not disturbed and the second image can be directly observed.

3. The hologram of claim 1, wherein the offset is constant and different from $\pi$ the optical reconstruction of the hologram being performed with a phase key introducing, according to the shape of the second image, a phase shift complementary to $\pi$ of said offset.

4. The hologram of claim 1, wherein the offset is not constant and is different from $\pi$ in different areas of the second image, the optical reconstruction of the hologram being performed with a phase key introducing, according to the shape of said areas of the second image, a phase shift complementary to $\pi$ of said offset.

5. The hologram of claim 1, wherein the second image is a grey-level image obtained by screening based on a screening cell, the size of the screening cell being an integral multiple of the size of a cell of the hologram.

6. The hologram of claim 1, wherein the second image is a random or semi-random matrix of black and white pixels, the size of a pixel of the second image being an integral multiple greater than or equal to 1 of the size of a cell of the hologram.

7. The hologram of claim 1, wherein the first image coded by the hologram has a decreased useful area, offset from the center of the general image by a distance at least equal to half the width of the useful area.

8. The hologram of claim 7, wherein the first image is offset by the introduction of a linear phase component in the phase distribution of the hologram.

9. A method for manufacturing a synthetic hologram superposed to a directly observable pattern, comprising the steps of:
   computer manufacturing of an image Ih for the hologram;
   computer manufacturing of an image Im of the pattern,
   calculation of the Fourier transform (FT) of image Ih,
   coding of the amplitude of the FT by generation of a matrix A of aperture sizes,
   coding of the phase of the FT by generation of an aperture offset matrix P,
   generation of a first amplitude matrix A1 corresponding to the intersection between A and Im,
   generation of a first phase matrix P1 corresponding to the intersection between P and Im,
   generation of a second amplitude matrix A2 corresponding to the intersection between the inverted or negative representation of A and the complementary of Im,
   generation of a second phase matrix P2 corresponding to the intersection between matrix P, to which is added a phase shift f0, and the complementary of Im,
   gathering of matrixes A1 and A2 in a single matrix A',
   gathering of matrixes P1 and P2 in a single matrix P',
   lithography of a substrate with the generation of a matrix of apertures having sizes and positions defined by the two previous matrixes.

\* \* \* \* \*